US010540789B2

(12) United States Patent
James et al.

(10) Patent No.: US 10,540,789 B2
(45) Date of Patent: Jan. 21, 2020

(54) LINE STYLIZATION THROUGH GRAPHICS PROCESSOR UNIT (GPU) TEXTURES

(71) Applicant: Autodesk, Inc., San Rafael, CA (US)

(72) Inventors: Sean P. James, Ontario, CA (US); David Timothy Rudolf, San Francisco, CA (US); Ravinder Patnam Krishnaswamy, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 15/914,678

(22) Filed: Mar. 7, 2018

(65) Prior Publication Data

US 2018/0232915 A1 Aug. 16, 2018

Related U.S. Application Data

(63) Continuation of application No. 14/798,165, filed on Jul. 13, 2015, now Pat. No. 9,928,621.

(60) Provisional application No. 62/023,659, filed on Jul. 11, 2014.

(51) Int. Cl.
*G06T 11/20* (2006.01)

(52) U.S. Cl.
CPC ........ *G06T 11/203* (2013.01); *G06T 2200/28* (2013.01)

(58) Field of Classification Search
CPC ..... G06T 11/203; G06T 1/20; G06T 2200/28; G06T 2210/36
See application file for complete search history.

(56) References Cited

U.S. PATENT DOCUMENTS

| 2004/0004611 A1* | 1/2004 | Komornicki | .......... G06T 11/206 345/418 |
| 2011/0115806 A1* | 5/2011 | Rogers | ...................... G06T 9/00 345/582 |
| 2013/0002679 A1* | 1/2013 | Cornell | ................. G06T 11/203 345/467 |
| 2015/0347108 A1 | 12/2015 | Munshi et al. | |

OTHER PUBLICATIONS

Loop, C., et al., "Resolution independent curve rendering using programmable graphics hardware", ACM Transactions on Graphics (TOG)—Proceedings of ACM SIGGRAPH 2005, vol. 24, No. 3, Jul. 2005, pp. 1000-1009.
Loop, C., et al., "GPU Gems 3", Dec. 2007, Chapter 25. "Rendering Vector Art on the GPU", NVIDIA Corporation http://developer.nvidia.com/GPUGems3/gpugems3_ch25.html.

(Continued)

*Primary Examiner* — William A Beutel
(74) *Attorney, Agent, or Firm* — Gates & Cooper LLP

(57) ABSTRACT

A method, apparatus, system, and computer program product provide the ability to render a line having line stylization/linetype pattern via texture mapping of a graphics processing unit (GPU). Linetype information for a pattern of a linetype for the line is acquired. The pattern is stored in a texture by encoding a type of element of the pattern and a texel center location. The GPU renders the line by computing a distance between a pixel of the line and the texel center location, determining if the distance exceeds a threshold, and rendering the pixel if the distance is within the threshold.

22 Claims, 16 Drawing Sheets

(56) References Cited

OTHER PUBLICATIONS

Taubin, G., et al., "Distance Approximations for Rasterizing Implicit Curves", ACM Transactions on Graphics, vol. 13, No. 1, Jan. 1994, pp. 3-42.
Adobe ("Divide a line into equal sections" Adobe Forum published at https://forums.adobe.com/thread/482958 and archived as of Oct. 31, 2009 at https://web-beta.archive.org/web/20091031211744/http://forums.adobe.com:80/thread/482958).
Stackoverflow, "Invariant stroke thickness of Path regardless of the scale", published at http://stackoverflow.com/questions/724139/invariant-stroke-thickness-of-path-regardless-of-the-scale, as of Apr. 21, 2009.

\* cited by examiner

LINE STYLIZATION THROUGH GRAPHICS PROCESSOR UNIT (GPU) TEXTURES

CROSS-REFERENCE TO RELATED APPLICATIONS

This application is a continuation under 35 U.S.C. § 120 of application Ser. No. 14/798,165, filed on Jul. 13, 2015, with inventor(s) Sean P. James, David Timothy Rudolf, and Ravinder Patnam Krishnaswamy, entitled "Line Stylization Through Graphics Processor Unit (GPU) Textures," which application is incorporated by reference herein, and which application claims the benefit under 35 U.S.C. Section 119(e) of the following co-pending and commonly-assigned U.S. provisional patent application(s), which is/are incorporated by reference herein: Provisional Application Ser. No. 62/023,659, filed on Jul. 11, 2014, by Sean P. James, David Timothy Rudolf, and Ravinder Patnam Krishnaswamy, entitled "GPU IMPLEMENTATION OF ZOOM DEPENDENT LINE TYPES."

BACKGROUND OF THE INVENTION

1. Field of the Invention

The present invention relates generally to computer-aided design (CAD) applications, and in particular, to a method, system, apparatus, and article of manufacture for stylizing lines using graphics processor unit (GPU) textures.

2. Description of the Related Art

Providing linetypes for two-dimensional (2D) CAD geometry is a core functionality in CAD applications. However, 2D CAD geometry has been a mostly neglected problem. In prior art 2D products, the problem was viewed as a central processing unit (CPU) problem, solved by tessellating the geometry into many line segments based on the linetypes. This means that extra data needs to be sent to the GPU for rendering, which reduces performance. A single line could be broken up into dozens or even thousands of line segments. While there have been GPU techniques for rendering continuous curves analytically, e.g. Bezier curves, the application of the GPU for basic 2D type drafting patterns and geometry has not been attempted in the prior art. In this regard, providing very high quality 2D line data with linetypes that conform to standards in a highly performance solution has not been possible in the prior art.

SUMMARY OF THE INVENTION

Embodiments of the invention leverage the power of the graphics processing unit (GPU) for efficient rendering of linetypes, specifically, the use of the texture as a mechanism to encode linetype pattern definitions. Embodiments of the invention use a two (2) channel texture to accomplish drawing 'dots' for CAD linetypes so they appear as dots at any zoom level. Instead of using textures for color information, texture parameter data about the geometry of the linetype (specifically the texture parameter at the midline of a texel) is stored. Thus, for 'dots' in a pattern, to handle zoom—the numeric value in the 'color' of the texture data is used to acquire an estimate of the pixel distance from the analytic 'dot'. Checks are then performed using the pixel shader of the GPU. This technique enables the ability to send a single line to the GPU, and have the pixel shader effectively break that line into many segments that make up the linetype, thus achieving the same rendering with much increased performance.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Basic linetypes in CAD consist of dashes, spaces, and dots, with specifications in terms of relative length of dashes and spaces and locations of dots. Embodiments of the provide a technique to render a linetype that has a simultaneous zoom dependent and zoom independent piece by using the texture to store information.

Unique aspects of embodiments of the invention include:

(1) Using a texture to draw a linetype and using a cumulative length based parameterization to map the line pattern using a texture buffer; and (2) Storing texel parameter information in the texture itself in order to be able to draw a dot by interpreting the texture value, normally used as a color or color component, as a reference texture coordinate.

Embodiments of the invention provide the ability to encode texture information for a linetype that includes a dot and a dash, where the dash size depends on zoom level but the dot size is fixed at all zoom levels. Such encoding is done by using a texture channel to store information about the pattern—the dash/dot type, and the texel parameter.

Additional embodiments of the invention may use a similar technique to render hatch patterns.

Hardware Environment

Figure 1:
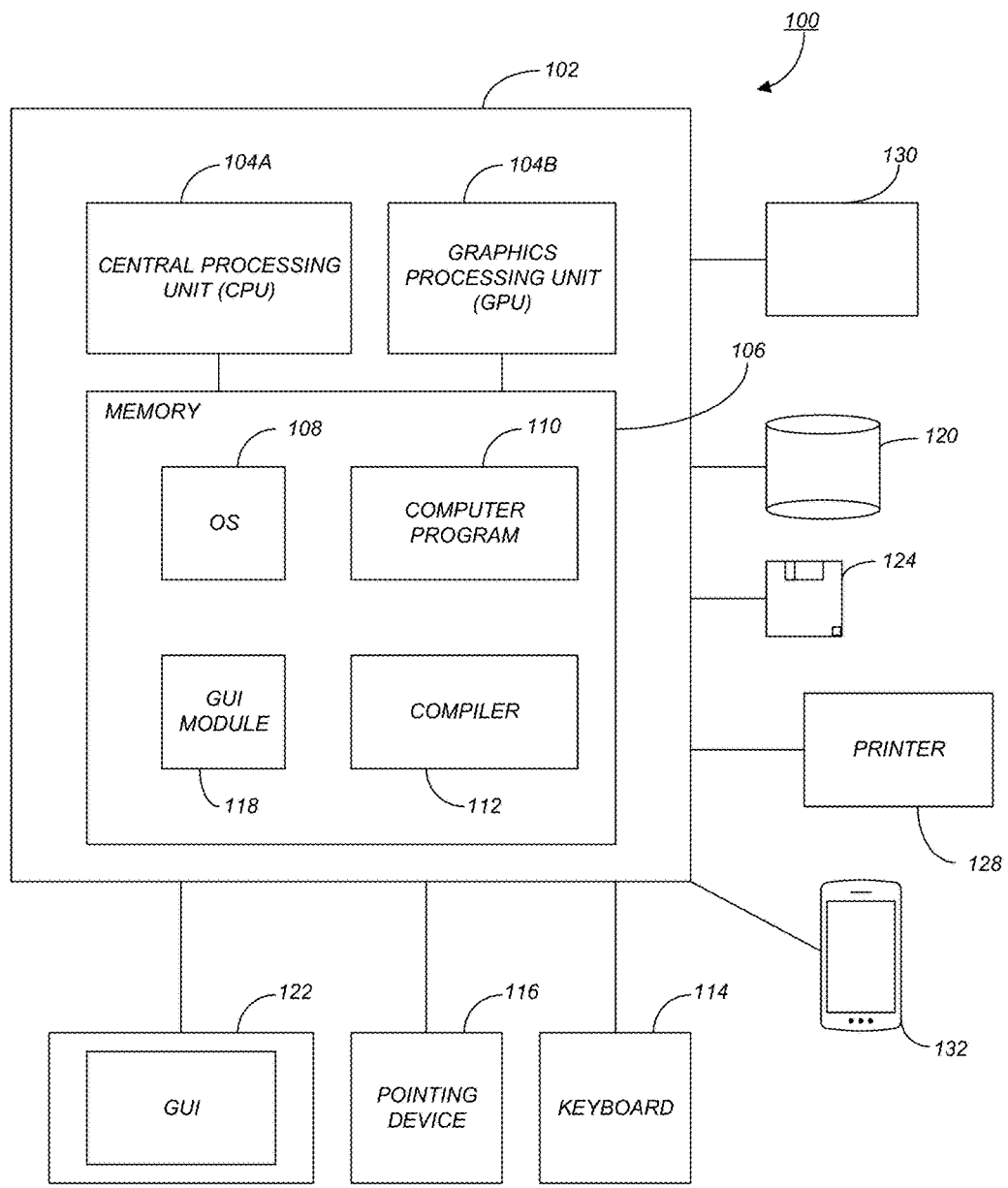
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a central processing unit (CPU) 104A (also referred to as a general purpose hardware processor) and/or a graphics processing unit (GPU) 104B (also referred to as a special purpose hardware processor) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results. The GPU 104B is configured to rapidly manipulate and alter memory to accelerate the creation of images in a frame buffer intended for output to a display. In particular, GPUs 104B are very efficient at manipulating computer graphics and image processing in a highly parallel structure that makes them more effective than general purpose CPUs 104A when processing large blocks of data in parallel. A GPU 104B may be present on a video card, or can be embedded on a motherboard, or may be part of a mobile device (e.g., a cellular phone).

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104A/104B from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in the GPU 104B and or a combination of the CPU 104A and GPU 104B. In such an embodiment, some or all of the computer program 110 instructions may be implemented via firmware instructions stored in a read only memory (ROM), a programmable read only memory (PROM) or flash memory within the GPU 104B or in memory 106. The GPU 104B may also be hardwired through circuit design to perform some or all of the operations to implement the present invention. Further, the GPU 104B may be a hybrid processor, which includes dedicated circuitry for performing a subset of functions, and other circuits for performing more general functions such as responding to computer program 110 instructions. In one embodiment, the GPU 104B is an application specific integrated circuit (ASIC).

The computer 102 may also implement a compiler 112 that allows an application or computer program 110 written in a programming language such as C, C++, Assembly, SQL, Python, Prolog, MATLAB, Ruby, Rails, Haskell, or other language to be translated into processor 104A/104B readable code. Alternatively, the compiler 112 may be an interpreter that executes instructions/source code directly, translates source code into an intermediate representation that is executed, or that executes stored precompiled code. Such source code may be written in a variety of programming languages such as Java™, JavaScript™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention and/or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
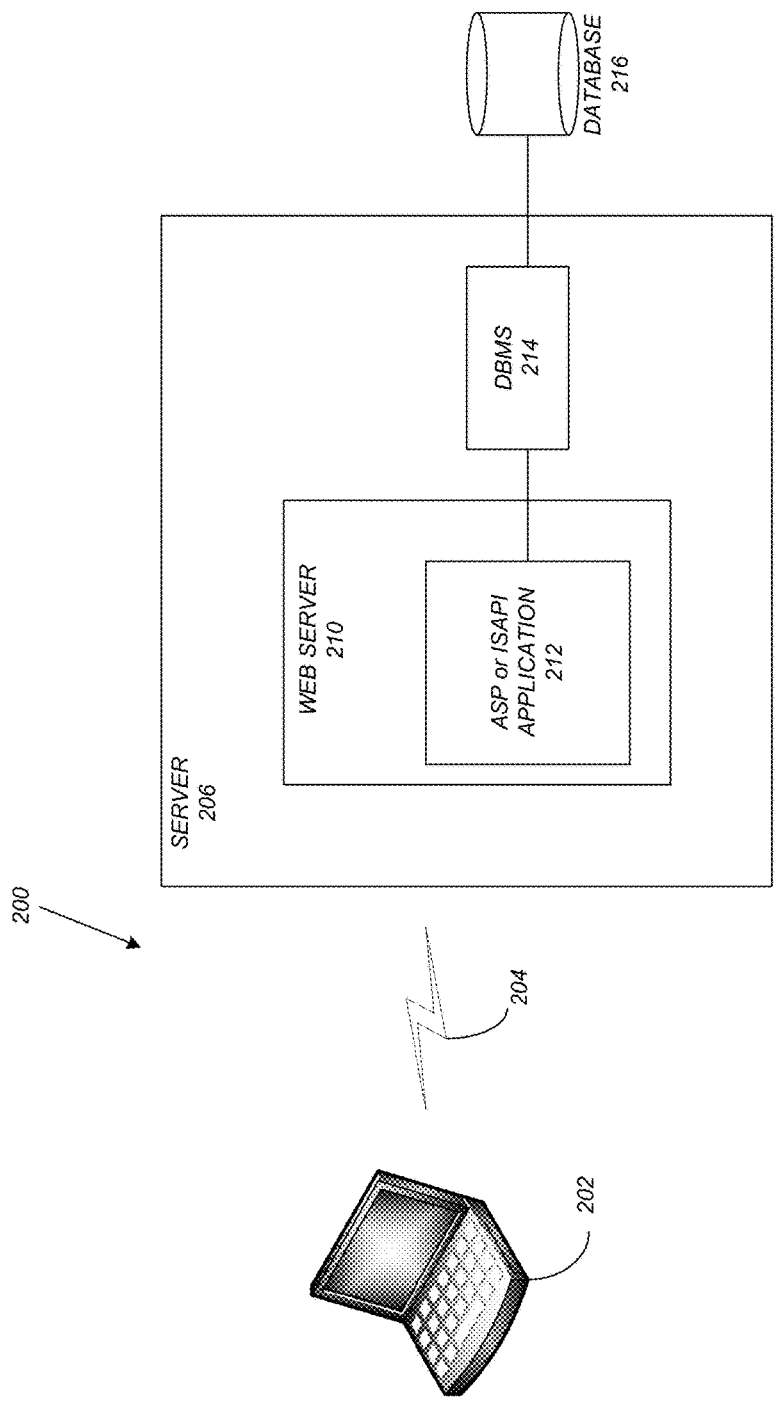
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability. Embodiments of the invention are implemented as a software application on a client 202 or server computer 206. Further, as described above, the client 202 or server computer 206 may comprise a thin client device or a portable device that has a multi-touch-based display.

Of course, those skilled in the art will recognize that any combination of the above components, or any number of different components, peripherals, and other devices, may be used with computers 202 and 206.

Software Embodiment Introduction

Linetypes are one of the most basic aspects of 2D CAD drawings. Linetypes consist of dashes, spaces, and dots. In the prior art, as a user zooms in or zooms out, the pattern of the linetype may change (e.g., dots becomes dashes as you zoom in). It is desirable for the pattern to stay constant or to present the option for the pattern to stay constant. Such a problem is a fundamental problem encountered by anyone trying to draw a line with a linetype. To enable such a constant pattern, additional information associated with the geometry may be required. With the increasing relevance of GPUs, including on mobile devices, embodiments of the invention utilize GPU processing (and the ability handle textures by a GPU) to enable and maintain linetype information in a consistent and expected manner.

Figure 3:
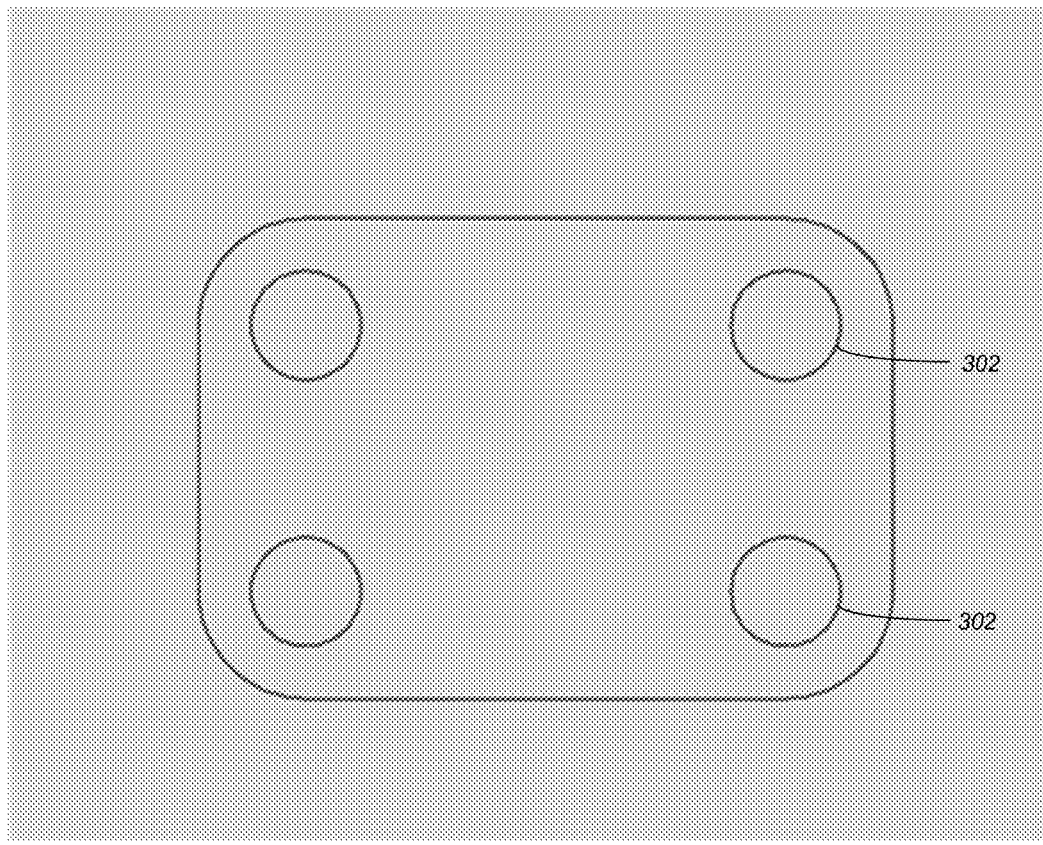
FIG. 3 illustrates the typical tessellation for a simple "faceplate" part showing some "jaggies" or aliasing in the prior art.
Figure 4:
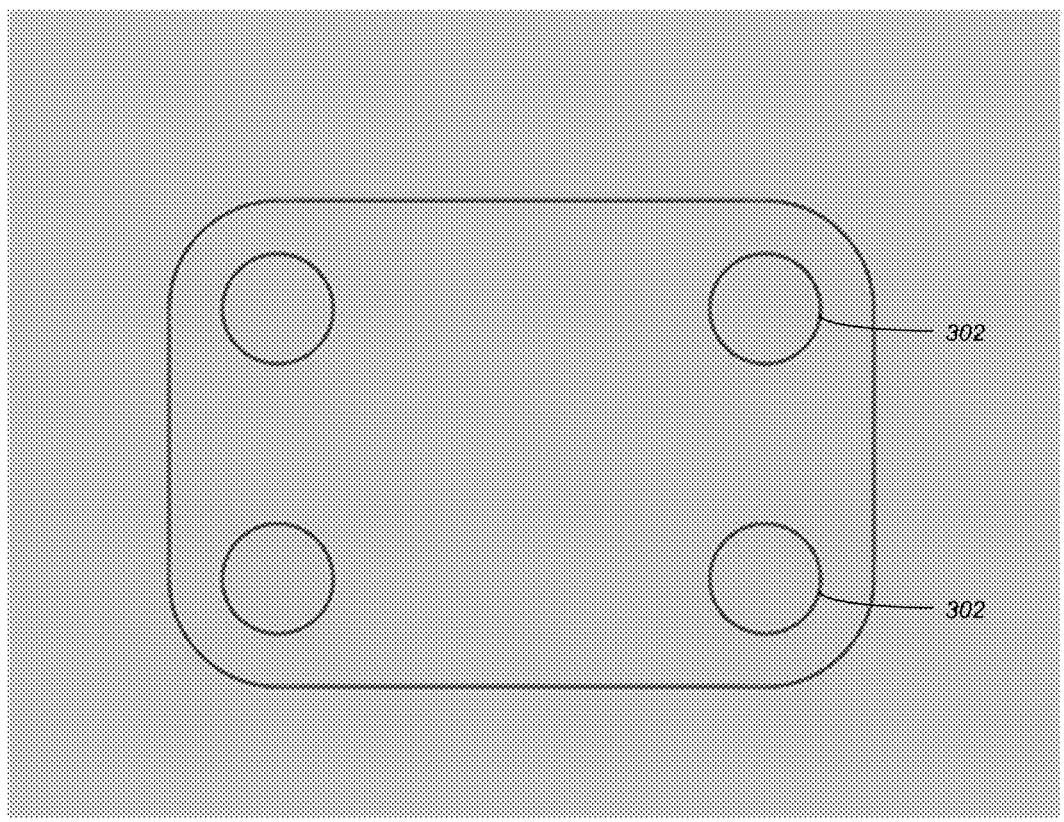
FIG. 4 illustrates the results of using analytic rendering (i.e., of the same faceplate as that of FIG. 3) from within a pixel shader of a GPU in accordance with one or more embodiments of the invention.

A core value of CAD applications is its 2D CAD documentation. A majority of the documentation may consist of simply line drawing—line, polyline, and arc geometry, with basic line types. While traditional methods using CPU based tessellation to draw linetypes are useable, the artifacts are definitely noticeable. The GPU provides the opportunity for differentiation in terms of the quality, performance and capacity for utilizing such linetypes. FIG. 3 illustrates the typical tessellation for a simple "faceplate" part showing some "jaggies" or aliasing in the prior art. In FIG. 3, the aliasing is visible in the circles 302 that are not smooth or consistent. In addition, further tessellation does not necessarily improve the results. Through careful consideration of the pixel distance from the exact curve, better results may be achieved. In this regard, FIG. 4 illustrates the results of using analytic rendering (i.e., of the same faceplate as that of FIG. 3) from within a pixel shader of a GPU in accordance with one or more embodiments of the invention. As can be seen, the circles 302 are smooth without aliasing.

Given the demographics of CAD users and the typical hardware/software configurations for such users, embodiments of the invention leverage GPU functionality (e.g., including the functionality in DX9 shader model 3 level), and provide a high level of quality and functionality for basic 2D rendering. Such capabilities has implications not only for the wide hardware base for CAD applications, but given that mobile devices also have functionality and power restrictions, the techniques utilized by embodiments of the invention can be leveraged on such mobile devices as well.

The classic geometry types in CAD applications are lines, circles, circle arcs, ellipses, and elliptical arcs. Such geometry are typically tessellated line segments. Embodiments of the invention provide the ability, for all of the geometric types, to:

(1) Create a minimal envelope on the CPU (i.e., render "envelope" geometry around the curve);
(2) Modify the envelope to the right location for the curve in the vertex shader (on the GPU); and
(3) Render the curve exactly with high quality in the pixel shader (on the GPU) (i.e., solve the curve equation in the pixel shader).

For example—for lines, circles and arcs, a quadrilateral envelope for each is created on the CPU and supplied to the GPU. The ellipse and elliptical arcs also get the circle envelope. The objective (in such an implementation) is to minimize work on the CPU. Accordingly, the CPU sends normalized envelope data to the GPU. The GPU vertex shader then transforms the envelope to fit the actual curve.

Figure 5:
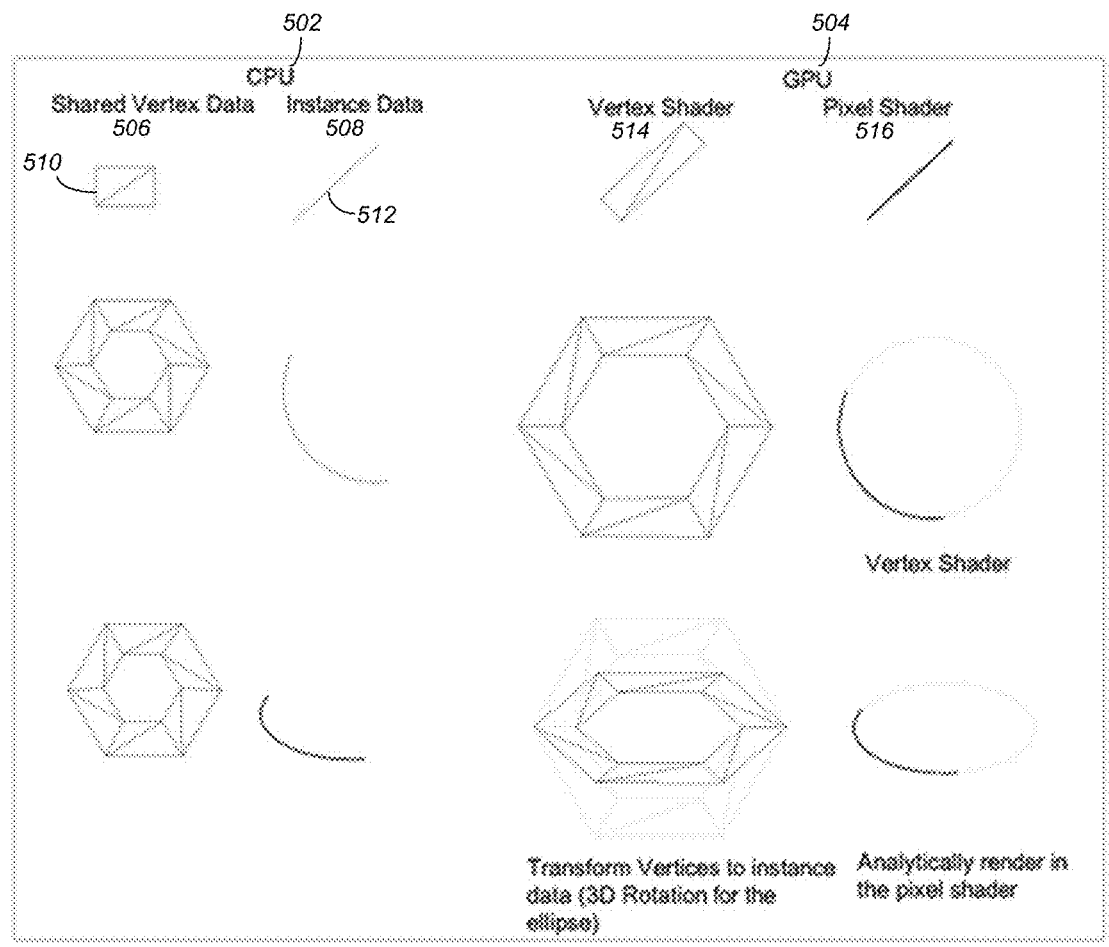
FIG. 5 illustrates the processing performed by the CPU and GPU for lines in accordance with one or more embodiments of the invention.

FIG. 5 illustrates the processing performed by the CPU and GPU for lines in accordance with one or more embodiments of the invention. FIG. 5 may be viewed as a pipeline from left to right with data flowing from the CPU 502 into the GPU 504. As an overview, the CPU creates canonical geometries in the form of the shared vertex data 506 for the instance data 508. For example, in the first row, rectangle 510 provides the canonical geometry for the line instance data 512. The CPU prepares the canonical geometry 506 and sends it to the GPU 504. The GPU 504 has multiple processors that work in parallel and typically perform processing in stages that includes a vertex shader 514 (that manipulates 3D vertices prior to rasterization) and a pixel shader 516 (also known as a fragment shader) (that computes color and other attributes of each "fragment" or single pixel). In the vertex shader 514, the GPU 504 uses the canonical shared vertex data 510 and instance data 408 to transform the endpoints/vertices, in parallel. Thus, the CPU 502 produces the canonical geometry 506 and passes all of the different canonical geometry line segments simultaneously to the GPU 504. The vertex shader 514 in the GPU 504 then transforms the vertices to instance data (e.g., 3D rotation for an ellipse) and the results are analytically rendered via the pixel shader 516.

In view of the general overview of FIG. 5 set forth above, for the ellipses, 3D processing is leveraged on the GPU 504 (i.e., the envelope is transformed to the ellipse in the vertex shader 514 by performing the appropriate 3D rotation of the circle). The vertex shader 504 transforms the end points of the envelopes to (float) screen coordinates. The zoom factor is taken into account in computing the transformed vertices (e.g. for the line envelope) as illustrated by the following code fragment.

```
// Calculate right vector
float2 right = float2(-forward.y, forward.x);
// Extend the line envelope more as the zoom level increases to
// improve pixel coverage
float zoomExt = max(common.ZoomLevel, 1);
// Calculate offset along forward and right vectors
float forwardAmt = len * input.position.x;
float rightAmt   = input.width / 2.0f * input.position.y;
// Transform position to contain curve
float2 position = input.p1 + forward * forwardAmt + right * rightAmt *
    zoomExt;
``` where forward is the unit vector from p1 to p2, len is the length of the vector from p1 to p2 and input.position is the canonical envelope vertex. Accordingly, the rectangle is defined from (0, −1) to (1, 1), and input positions are specified (i.e., input.position.x=0 or 1, input.position.y=−1 or 1).

The (u,v) parameters are mapped so −u is the texture parameter along the line, and v is the distance (in pixel space) from the center line. Thus, in embodiments of the invention, the (u, v) parameters are used for very different purposes—the u is the position along the linetype texture, and v is used in conjunction with the falloff function to anti alias the curve. For a line, −v directly gives the distance from the line.

For a circle of radius r given the projected circle center c, for the pixel p(x, y), the distance from the curve is easily determined as (length(p−c)−r).

Figure 6:
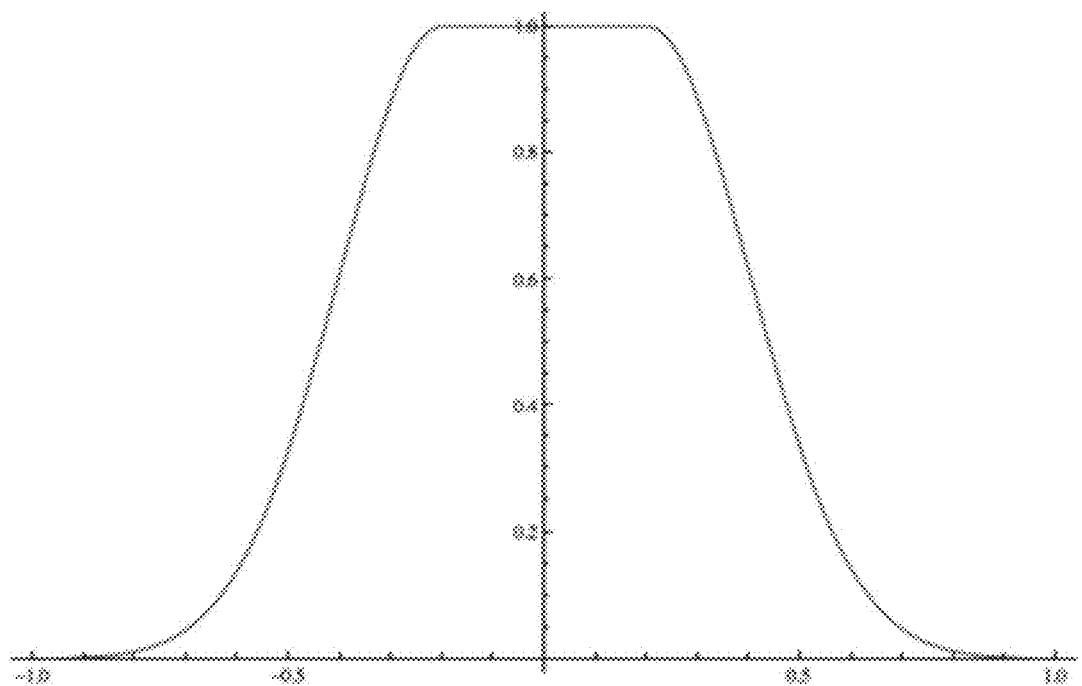
FIG. 6 illustrates a bell-curve that is used for anti-aliasing in accordance with one or more embodiments of the invention.

To render high quality 2D, there are several components. The basic component includes a continuous piece of geometry (e.g., a line, ellipse, etc.). To render such continuous geometry, an envelope that is computed efficiently may be utilized. Further, to achieve a good anti-aliased effect, a falloff function may be utilized (e.g., a Guassian that empirically provides the best effect). FIG. 6 illustrates a bell-curve that is used for such anti-aliasing in accordance with one or more embodiments of the invention.

Ellipses

Ellipses are more complex than the lines/curves illustrated in FIG. 5. To find the closest point to an ellipse is equivalent to minimizing:

$$e(\theta)=\sqrt{(x-a\cos(\theta))^2+(y-b\sin(\theta))^2}$$

which turns out to require a numerical method to solve to get the roots (something that cannot be implemented on a shader). Alternative embodiments may utilize options set forth in the following papers that are incorporate by reference herein:

Charles Loop and Jim Blinn, Resolution Independent Curve Rendering Using Programmable Graphics Hardware, ACM Transactions on Graphics (TOG)—Proceedings of ACM SIGGRAPH 2005, Volume 24 Issue 3, July 2005, Pages 1000-1009 ("Loop 2005"); and Charles Loop and Jim Blinn, GPU Gems 3, Chapter 25—Rendering Vector Art on the GPU, 2008 ("Loop 2008").

Given the implicit function f for an ellipse and a point to shade p, one can estimate the distance d(p) to the ellipse by:

$$f(p=(x,y)) = \frac{x^2}{a^2} + \frac{y^2}{b^2} - 1$$

$$d(p) = \frac{f(p)}{|\nabla f(p)|}$$

The reference, Gabriel Taubin, Distance Approximations for Rasterizing Implicit Curves, ACM Transactions on Graphics, Vol. 13, No. 1, January 1994, Pages 3-42, which is incorporated by reference herein, has the derivation, which is based on an expansion of the first order Taylor series for $f$, discarding the nonlinear terms, then applying the triangular then Cauchy-Schwarz inequalities.

Loop 2005 solved the problem for rendering Bézier curves on the GPU—and this solution can be extended to any implicit curve (including ellipses as set forth herein).

The ddx( ) and ddy( ) intrinsic functions available in HLSL (high level shading language for DirectX™) since DX9 provides the required approximation to the gradient on the GPU in order to implement the above formula.

The following code fragment computes a first order approximation of the distance from the ellipse in the pixel shader.

```
// Get gradient of UVs
float2 dx = ddx(input.uv);
float2 dy = ddy(input.uv);
// Square ellipse radii
float r1_2 = input.size.x * input.size.x;
float r2_2 = input.size.y * input.size.y;
// Square u, v
float u_2 = input.uv.x * input.uv.x;
float v_2 = input.uv.y * input.uv.y;
// Ellipse function derivative with chain rule
float dfx = (2 * input.uv.x) / r1_2 * dx.x + (2 * input.uv.y) / r2_2 * dx.y;
float dfy = (2 * input.uv.x) / r1_2 * dy.x + (2 * input.uv.y) / r2_2 * dy.y;
// Approximate signed distance from curve with
// f(u,v) / |gradient(f(u,v))|
float sd = (u_2 / r1_2 + v_2 / r2_2 - 1) / sqrt(dfx * dfx + dfy * dfy);
``` and sd—is used to determine the ellipse width, which, in conjunction with the falloff function, gives the required analytical antialiased curve. All of the computation here is done in the pixel shader 516. The quality improvement is clearly discernible over the tessellated curve.

Figure 7:
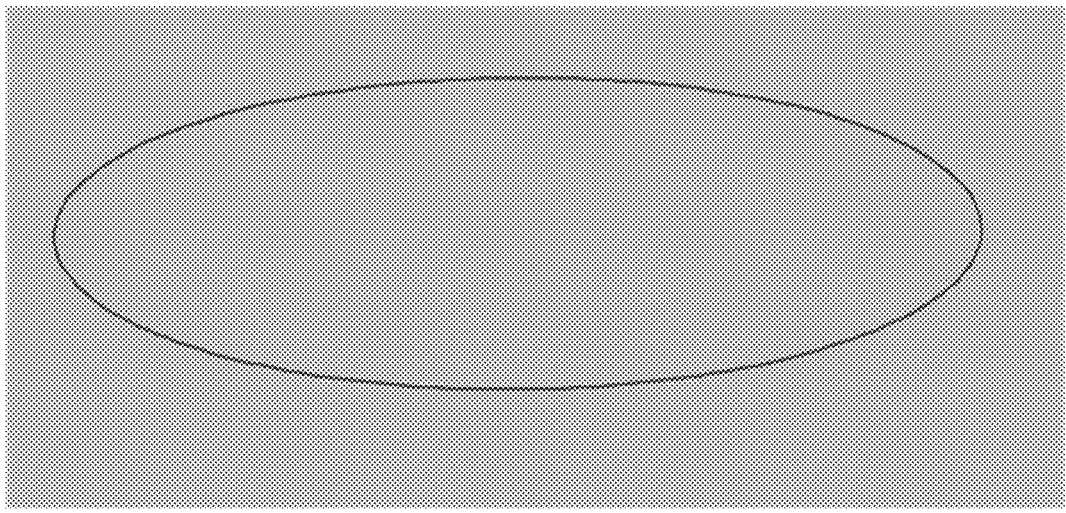
FIG. 7 illustrates a tessellated ellipse created in accordance with the prior art.
Figure 8:
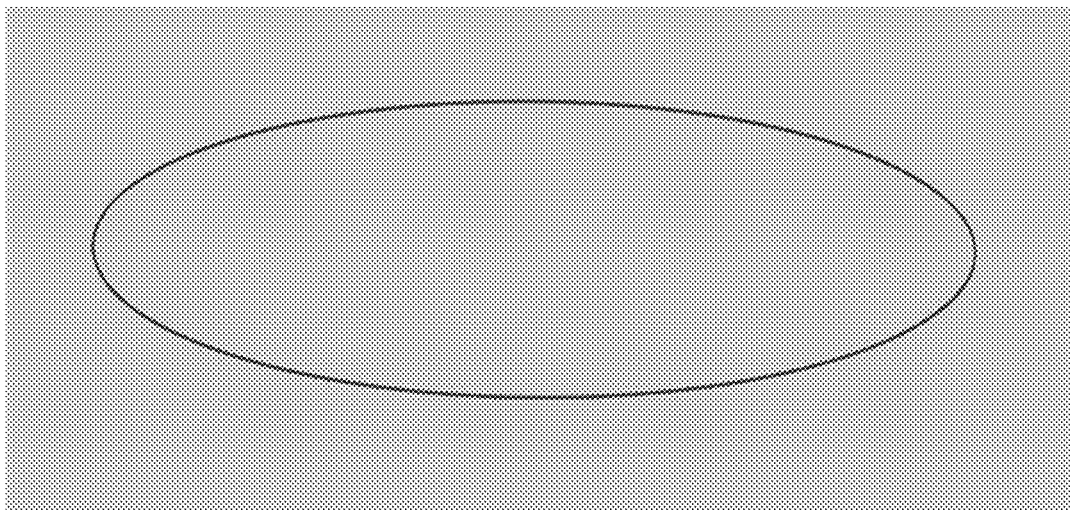
FIG. 8 illustrates an analytic ellipse rendered through shaders in accordance with one or more embodiments of the invention.

FIG. 7 illustrates a tessellated ellipse created in accordance with the prior art. In contrast, FIG. 8 illustrates an analytic ellipse rendered through shaders in accordance with one or more embodiments of the invention (as described above).

Linestyles

Linestyles Introduction

Line stylization and line types have specific needs in engineering drawing. Handling corners around curves, and starts and ends of an open curve are two key areas that need to be addressed. Embodiments of the invention utilize the approach of texture sampling to produce linetypes. The advantages of this approach include:

1. Leveraging a highly used and basic GPU feature, namely texture mapping, that is supported by even the most basic shader models (including mobile); and
2. Low memory footprint—no need to tessellate geometry or create intermediate tessellations.

Challenges of utilizing texture mapping to produce linetypes include:

1. Pattern alignment and parameterization. How to map texture parameters onto the texture to get the desired line pattern fidelity; and
2. Zoom variant linetypes. Implementing the classical linetype—where the dash length increases with zooming and decreases when zooming out. The zoom invariant type, where dashes stay the same and realign, is simpler to implement using textures, since the pixel to texel scale is constant.

As background information, a texel or texture pixel is the fundamental unit of texture space. Textures are represented by arrays of texels, just as pictures are represented by arrays of pixels. When texturing a 3D surface (a process known as texture mapping), a renderer (within a GPU) maps texels to appropriate pixels in the output picture. The texturing process starts with a location in space and a projector function is applied to the location to change the location from a three-element vector to a two-element vector with values ranging from zero to one (uv). These values are multiplied by the resolution of the texture to obtain the location of the texel.

Parameterization and Mapping (Encoding of the Linetype)

Embodiments of the invention use a 2D texture as an array of 1 dimensional textures. In this regard, any mechanism that specifies a 1D pattern may be utilized to define the texture/linetype patterns. In one or more embodiments, the texture is programmatically generated from CAD application (e.g., AutoCAD™) linetypes. The linetype specification for basic linetypes is very simple—essentially the length is specified for each component of the linetype pattern (e.g., dash, dot, and space). Each linetype may be defined on two lines in a linetype definition file. The first line contains the linetype name and an optional description. The second line is the code that defines the actual linetype pattern and must begin with the letter A (alignment), followed by a list of pattern descriptors that define pen-up lengths (spaces), pen-down lengths (dashes), and dots. Thus, the format of the linetype definition is:

*linetype_name, description

A, descriptor1, descriptor2,

The following illustrates an exemplary linetype definition:

*ACAD_ISO05W100, ISO long-dash double-dot _ . _ . _ ..

A,24,−3,0,−3,0,−3

The first line identifies the name of the linetype. In the second line, 24 represents the dash (that is 24 units long), −3 the space (that is 3 units long), 0 the dot (positive, negative and zero), followed by another 3-unit long space, another dot, and a third 3-unit long space. Thus, the linetype ACAD_ISO05W100 contains a pattern consisting of: a long dash, a space, a dot, a space, a dot, and a space (i.e., a long dash followed by two dots [referred to as double-dot]).

To store this linetype in a texture, a texture size width corresponding to the screen resolution is chosen (so in the 1-1 case, 1 pixel=1 texel). The pattern is scaled to fit the row, based on linetype scale factor, i.e. how many repetitions occur in a 1-1 pixel-texel case. This makes the mapping of linetypes to textures very efficient—essentially one NxL bitmap is programmatically generated from the linetype table—where N=number of linetypes, L=texture resolution (screen width).

Figure 9:
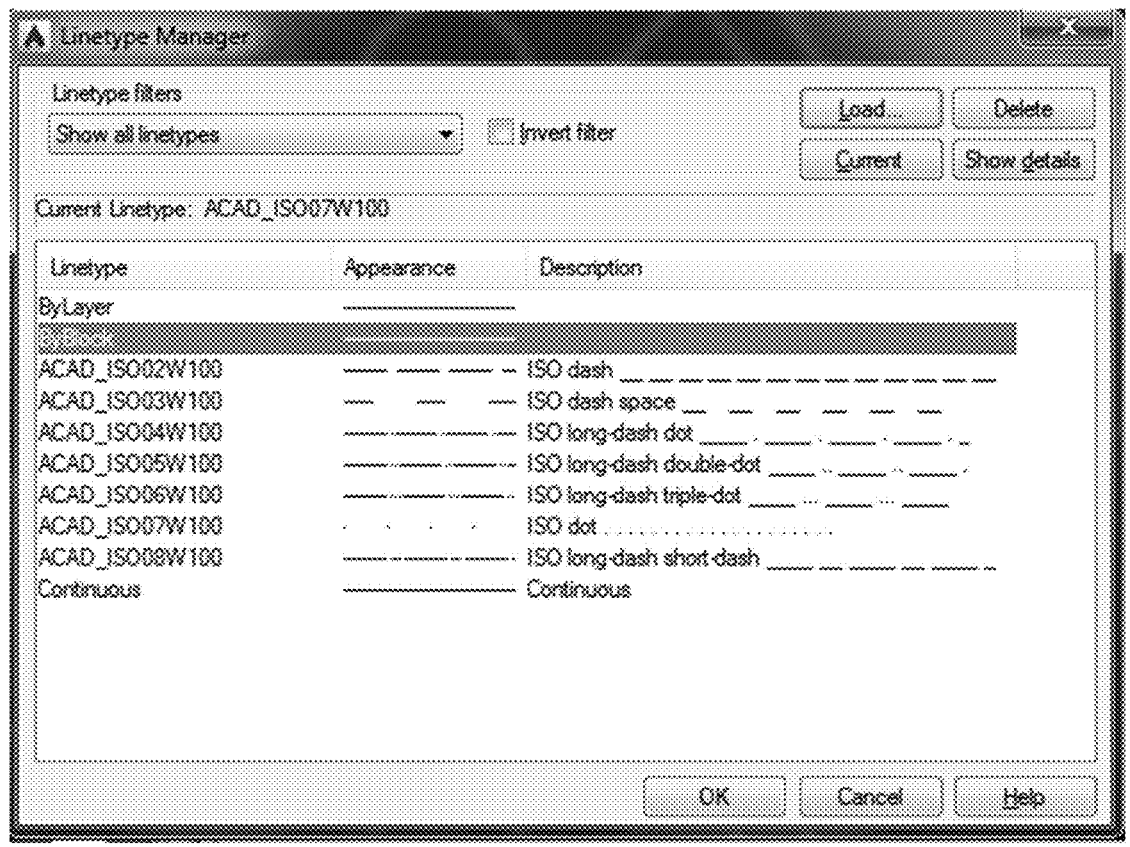
FIG. 9 illustrates a dialog window with an exemplary listing of linetypes/linetype names, linetype appearances, and linetype descriptions in accordance with one or more embodiments of the invention.

In terms of parameter mapping, the (u,v) parameter maps to:
u—position along the pattern
v—linetype FIG. 9 illustrates a dialog window with an exemplary listing of linetypes/linetype names, linetype appearances, and linetype descriptions in accordance with one or more embodiments of the invention.

Figure 10:
FIG. 10 illustrates a DirectX™ (DX™) resource viewer view of the linetypes identified in FIG. 9 in accordance with one or more embodiments of the invention.

The linetypes map into a 2D texture. FIG. 10 illustrates a DirectX™ (DX™) resource viewer view of the linetypes identified in FIG. 9 in accordance with one or more embodiments of the invention. The horizontal pattern reflects the linetype encoded in the row. FIG. 10 may also include a color variation. In this regard, the textures may be represented using a 2 channel 32 bit float texture, (R,G), where:
R: Dash/Dot/Blank value—a float that indicates the type of element of the linetype. The R value is illustrated in FIG. 10 as the darker pixels 1002. In an actual image, the R value may be encoded in a color (e.g., blue).
G: The float parameter value for the center of the texel. For example, if the texture resolution is 20×2048 (20 linetypes×2048 texels) then for the 12th pixel, the texel mid will be (1/2048)*(12+0.5)

This G channel is used to handle dots in the linetype as described below. The G channel may not be used as a graphical component, but instead, identifies the texel center that can then be used to determine the distance of a pixel from the texel center.

Accordingly, the two channels (R,G) that are traditionally used for red and green are not used for color in embodiments of the invention. Instead, the red channel is used to determine the type of element (i.e., whether it is a dot, dash, or a blank space), and the G value is used to identify the center of the texel. Based on the information, the numerical sequence/stream in the two channels is encoded into the image/texture (e.g., as illustrated in FIG. 10) and utilized by the GPU.

Parameterization, Continuation and Polylines

While parameterization, in general, may exist in the prior art, embodiments of the invention utilization texel parameters to ensure a continuous linetype across a line that consists of multiple line segments/curves/arcs/etc. More specifically, as described above, linetype data is encoded into the two channels of a 2D texture and include elements that can be used to ensure continuity.

In particular, parameters that are numbers (i.e., representing the type of pattern element [dash, dot, or space] and a texel center location), along with pieces of geometry are passed to the pixel shader. Such parameters are pre-computed in such a way to achieve continuous and consistent rendering of the pattern across different line segments.

To perform such rendering, one of the stored parameters is based on the composite length of the curve. For example, if a curve has a known length of 10 units, and a second curve starts at 2.5 with a repeating pattern of unit length 1, when rendering the pattern, the GPU will start at 0.5 units in the pattern (i.e., 2.5 mod 1) (i.e., the GPU knows how much to offset into the pattern so that it looks continuous). In another example, if a template is overlaid onto a curve (consisting of a line and an arc), the GPU needs to begin the pattern at the correct location. Accordingly, if the line portion of the curve is 1.5 times the length of the template, the pattern in the template will end at the ½ way point. Accordingly, when the arc is started, the pattern needs to commence at the ½ way point. Thus, to ensure consistency and to begin the pattern at the appropriate location, the cumulative length of the curve is passed/stored as a parameter.

In view of the above, parameterization is based on length (or relative length). Each geometry segment (line, arc, ellipse, etc.) has the start U parameter stored at creation time. In the vertex shader, depending on whether the canonical envelope vertex coordinate is x=0 or x=1, the vertex U value is either:
(x=0 case): the cumulative length up to the beginning of the segment—which for a stand-alone segment is 0.0, for a polyline is the cumulative length up to that vertex; or
(x=1 case): the cumulative length+the length of the segment itself.

Since parameter values are linearly interpolated, for a line, the value at a pixel is determined by the texture R value at the interpolated parameter. The R value defines if the pixel maps to a dot, dash or space.

For Circles or Circle Arcs, mapping the pixel to length along the arc is simple—using s=r*theta where r is the radius and theta is the angle along the arc in radians. This gives the length along the arc segment.

Ellipses are more difficult with respect to length based parameterization. There is no simple formula to map a point on an elliptical arc to the length from the start of the ellipse. Accordingly, approximations are used with respect to ellipses. The distance along the curve can be expressed as:

$$\langle x(\theta), y(\theta) \rangle = \langle a\cos(\theta), b\sin(\theta) \rangle$$

$$\langle x'(\theta), y'(\theta) \rangle = \langle -a\sin(\theta), b\cos(\theta) \rangle$$

$$s(\theta) = \int_{\theta_0}^{\theta} \sqrt{x'(\theta)^2 + y'(\theta)^2}\, d\theta$$

$$s(\theta) = \int_{\theta_0}^{\theta} \sqrt{a^2\sin^2(\theta) + b^2\cos^2(\theta)}\, d\theta$$

This is the subject of elliptical integrals—which are solved by numerical iteration techniques, which are not feasible for implementation on a shader. The function $$\sqrt{a^2\sin^2(\theta) + b^2\cos^2(\theta)}$$

Figure 11:
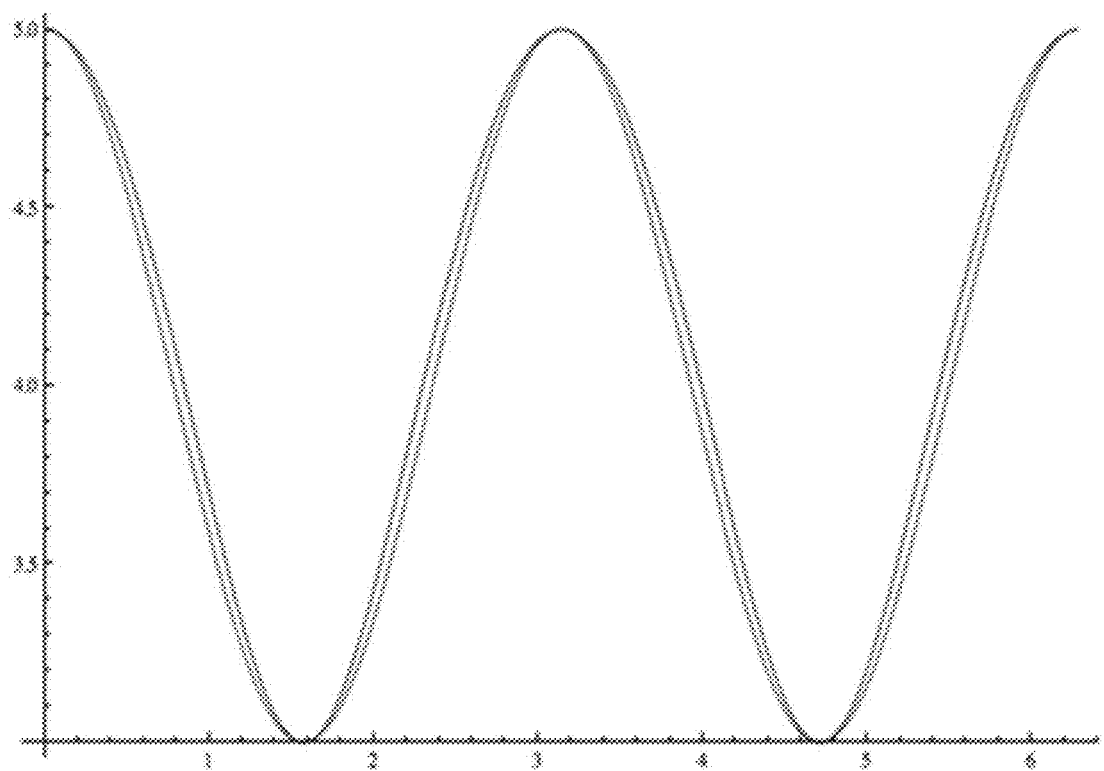
FIG. 11 illustrates a graph of a solution of elliptical integrals solved using approximation techniques in accordance with one or more embodiments of the invention.

However is very similar to $$\frac{b-a}{2}\cos(2\theta) + a + \frac{b-a}{2}$$

the graph of which is illustrated in FIG. 11. Such a function can be integrated easily, and offers a good approximation. Embodiments of the invention may use such an approximation with good results.

Figure 12:
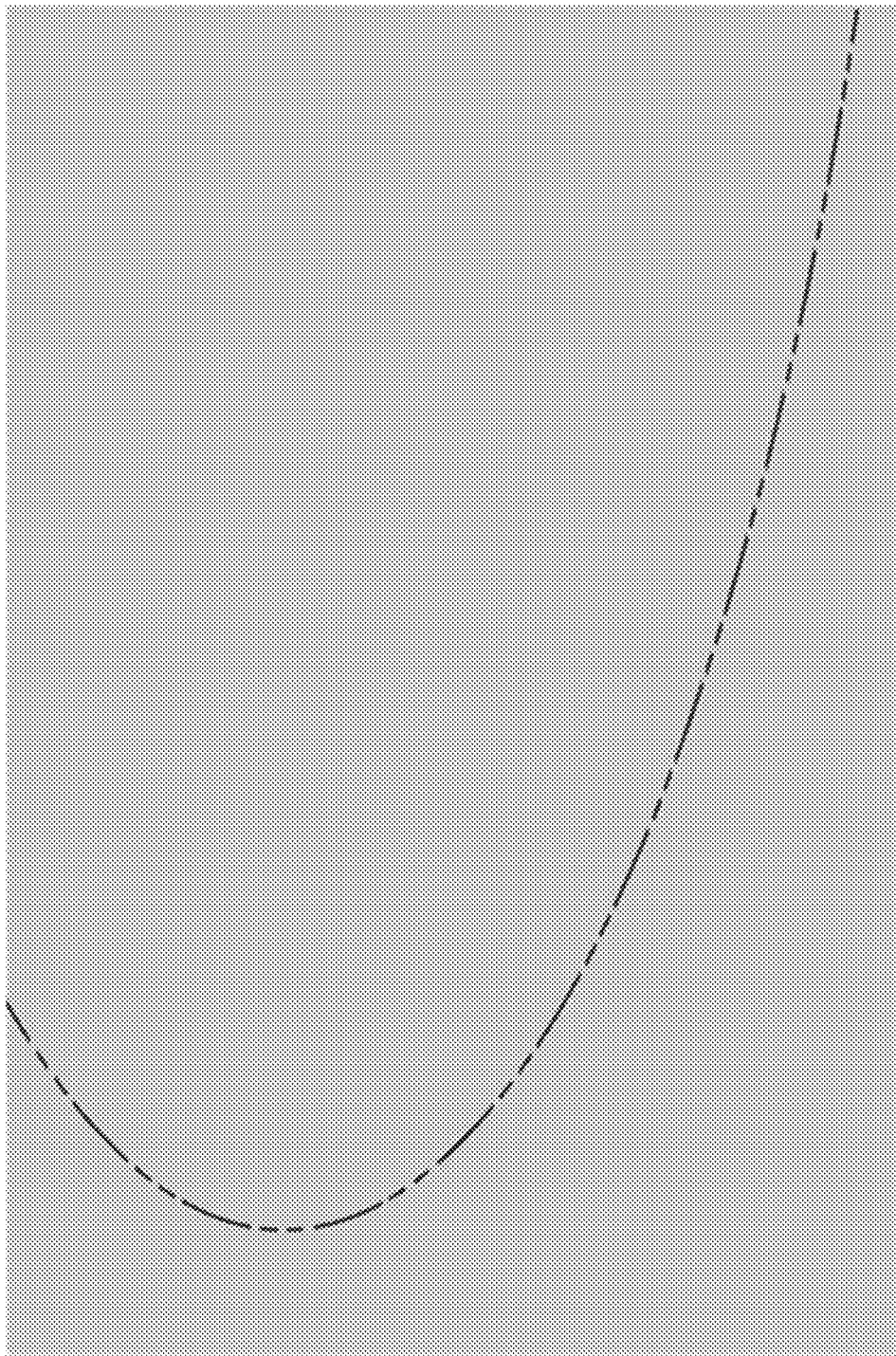
FIG. 12 illustrates linetypes that follow a curve in accordance with one or more embodiments of the invention.

FIG. 12 illustrates linetypes that follow the curve in accordance with one or more embodiments of the invention. As illustrated, the linetypes follow the transitions at the tangents between different curve types.

Zoom Invariance and Zoom Variance with Dots

Figure 13:
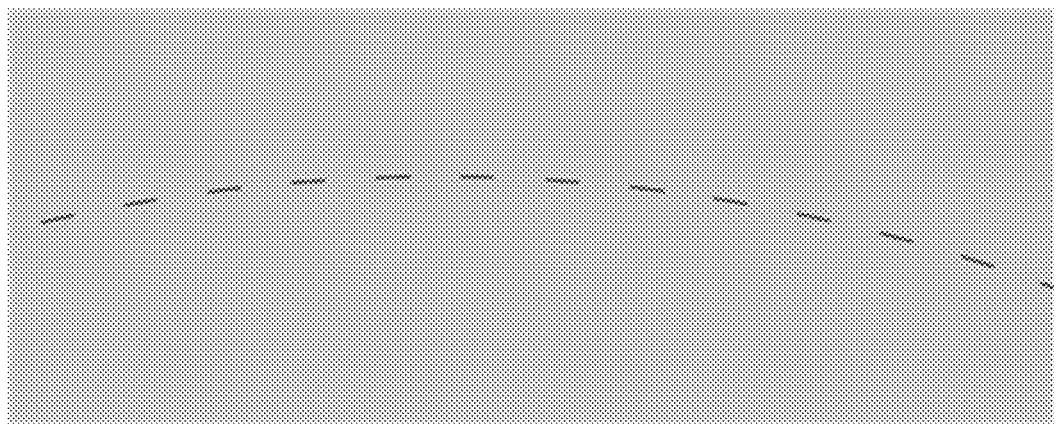
FIG. 13 illustrates zoom invariants in accordance with one or more embodiments of the invention.
Figure 14:
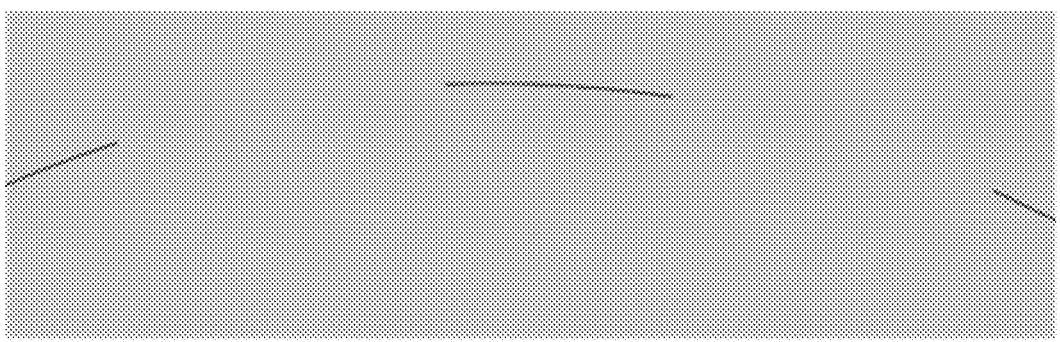
FIG. 14 illustrates zoom variants in accordance with one or more embodiments of the invention.

As used herein, zoom invariance means where the dashes on the screen keep the same length irrespective of the zoom level. FIG. 13 illustrates zoom invariants in accordance with one or more embodiments of the invention. Similarly, FIG. 14 illustrates zoom variants in accordance with one or more embodiments of the invention. In FIG. 14, as the zoom level increases, the dashes on the screen change in length. In order to achieve zoom variant linetypes, embodiments of the invention use point sampling. Point sampling was used instead of bilinear to avoid the need to average values of the pixels.

Figure 15:
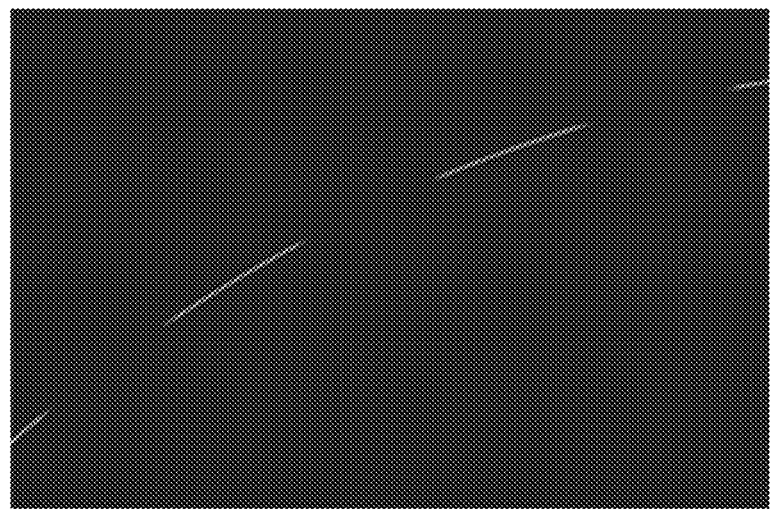
FIG. 15 illustrates bilinear texture sampling where there is fuzzing at the ends of the dashes in accordance with one or more embodiments of the invention.
Figure 16:
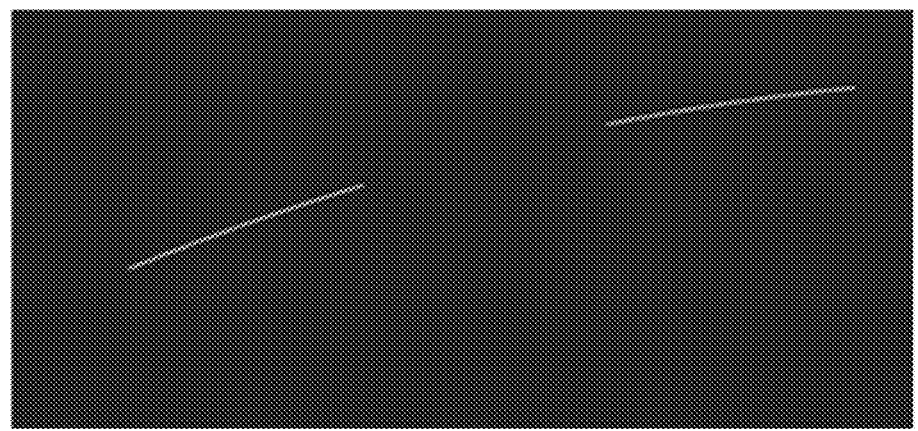
FIG. 16 illustrates the results of point sampling to avoid fuzzing in accordance with one or more embodiments of the invention.

FIG. 15 illustrates bilinear texture sampling where there is fuzzing at the ends of the dashes. In contrast, embodiments of the invention may utilize point sampling to avoid fuzzing, thereby providing results such as that illustrated in FIG. 16.

Figure 17:
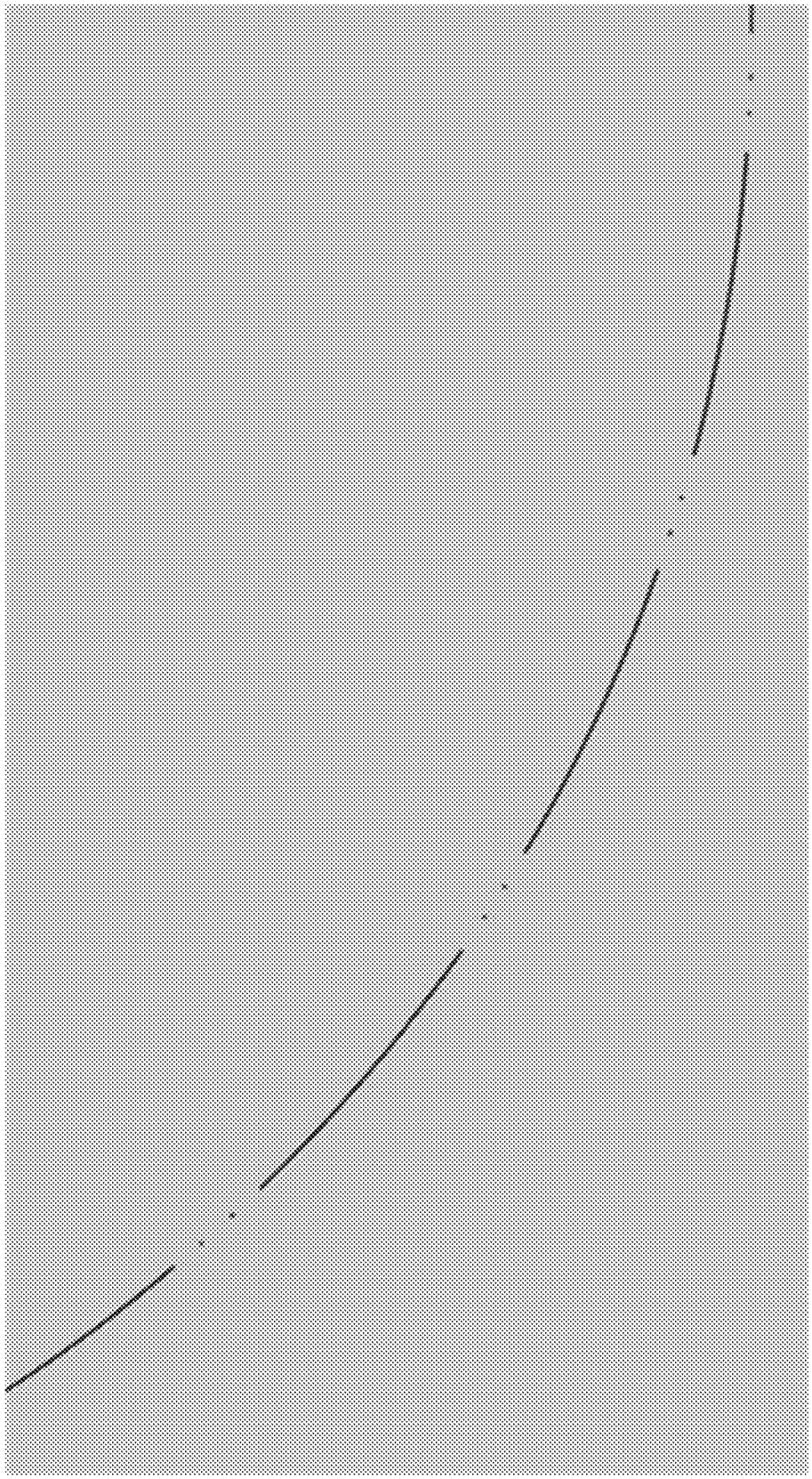
FIG. 17 illustrates a curve with a linetype pattern of a dash and two dots in accordance with one or more embodiments of the invention.
Figure 18:
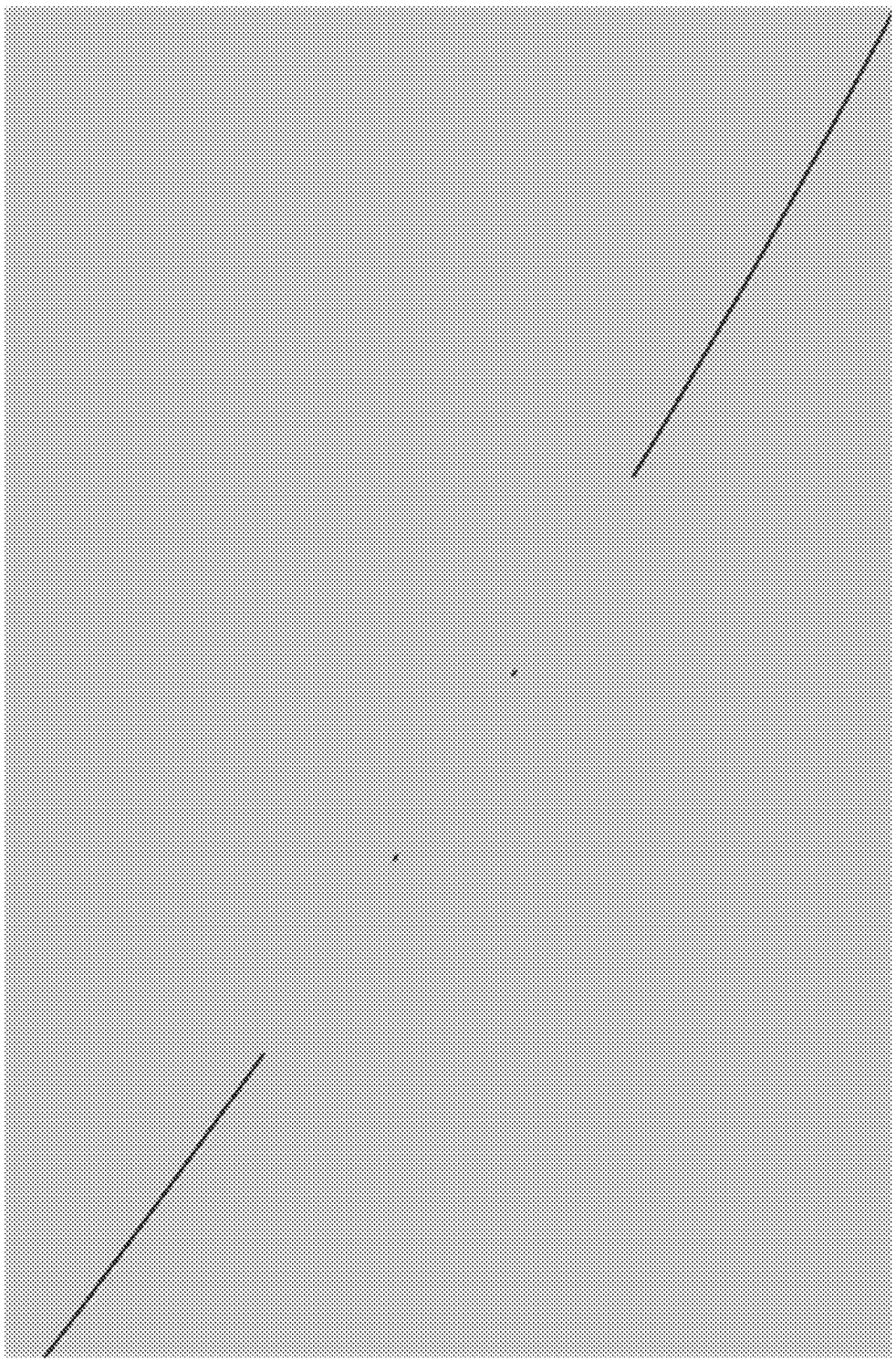
FIG. 18 illustrates a zoomed-in view of the linetype pattern of FIG. 17 with dots remaining the same size while the dashes increase in length in accordance with one or more embodiments of the invention.

As described above, one key issue that needs to be handled is that of dots. With point sampling, as one zooms in, a single dot in a pattern could map to an arbitrarily large number of pixels depending on the zoom factor. This is where the G channel value was used. As illustrated in FIG. 17, a curve with a linetype pattern of a dash and two dots is illustrated. When zooming in, it is desirable to have the dots remain the same size while the dashes increase in length as illustrated in FIG. 18. To provide such functionality, a distance parameter is stored in a texel value as described in further detail below.

In general, the concept of parameterization exists in the prior art. However, embodiments of the application apply parameterization for GPU rendering. In particular, as described above, a 2 channel texture may be used to accomplish drawing "dots" for CAD linetypes so they appear as dots at any zoom level. Instead of using textures for color information, texture parameter data about the geometry of the linetype is stored (specifically, the parameter at the midline of a texel). Accordingly, for "dots" in a pattern, to handle zoom, the numeric value is the "color" that is used to acquire an estimate of the pixel distance from the analytic "dot", with checks performed on the GPU in the pixel shader.

To restate the problem, if the user zooms in sufficiently, the problem is—how to determine how "far" the pixel is from the center of the texel. As a user zooms into a dot, more and more pixels on the screen will map to a texel for the dot. If a pixel is more than a threshold distance from the center of the texel (and you know that the geometry being rendered is a dot), then the pixel is not rendered (i.e., is not lit up). Accordingly, only pixels within a threshold distance of the center of a texel are actually rendered. The intrinsic functions ddx( ) and ddy( ) that give the rate of change of a TEXTURE semantic pixel shader input, offer the solution.

When the value is the u of the (u,v) for a linetype, the ddx( ) partial differential approximation (or ddy( ) for that matter) give the delta_u value between adjacent pixels. Using delta u value, one can estimate the distance from the texel center as illustrated in the following exemplary code:

```
// Texture parameter in the center of the texel
float cend = LineTexture.Sample(LineSampler, texCoords).g;
// Critical test - test if the distance of the pixel center texture
// parameter from the texel center is within a desired tolerance
float fracp = frac(Param * scale + Scale.x * .5f);
if (fracp < cend && cend - fracp <  4 *abs(ddxuv.x) * scale)
    tex = 1.0;
else
    tex = 0.0;
```

In the above code, ddxuv is the result of calling ddx( ). The x component is the only one needed, since that is the delta u along the linetype pattern in the texture. Param is the length based parameter on the curve. Scale.x is the texel width (i.e. 1/number of texels per row). Scale is the zoom scale (or linetype scale).

The above code makes sure only 4 pixels to the left of the center texel value are drawn no matter what the zoom value. This logic enables the pixel shader to draw only 4 dots at the texel center no matter what the zoom level.

In view of the above, embodiments of the invention may view a texture as an image with each row in the image having two (2) channels (each pixel has two floating point values). The first floating point value encodes information regarding whether the pixel is on/off. The second floating point value encodes the texel center. One function of a GPU is to interpolate a value based on texture parameters. Thus, the distance between the pixel center texture and the texel center is computed. The pixel shader is then used to compare the computed distance to a threshold value to determine whether the pixel should be turned on or not.

Figure 19:
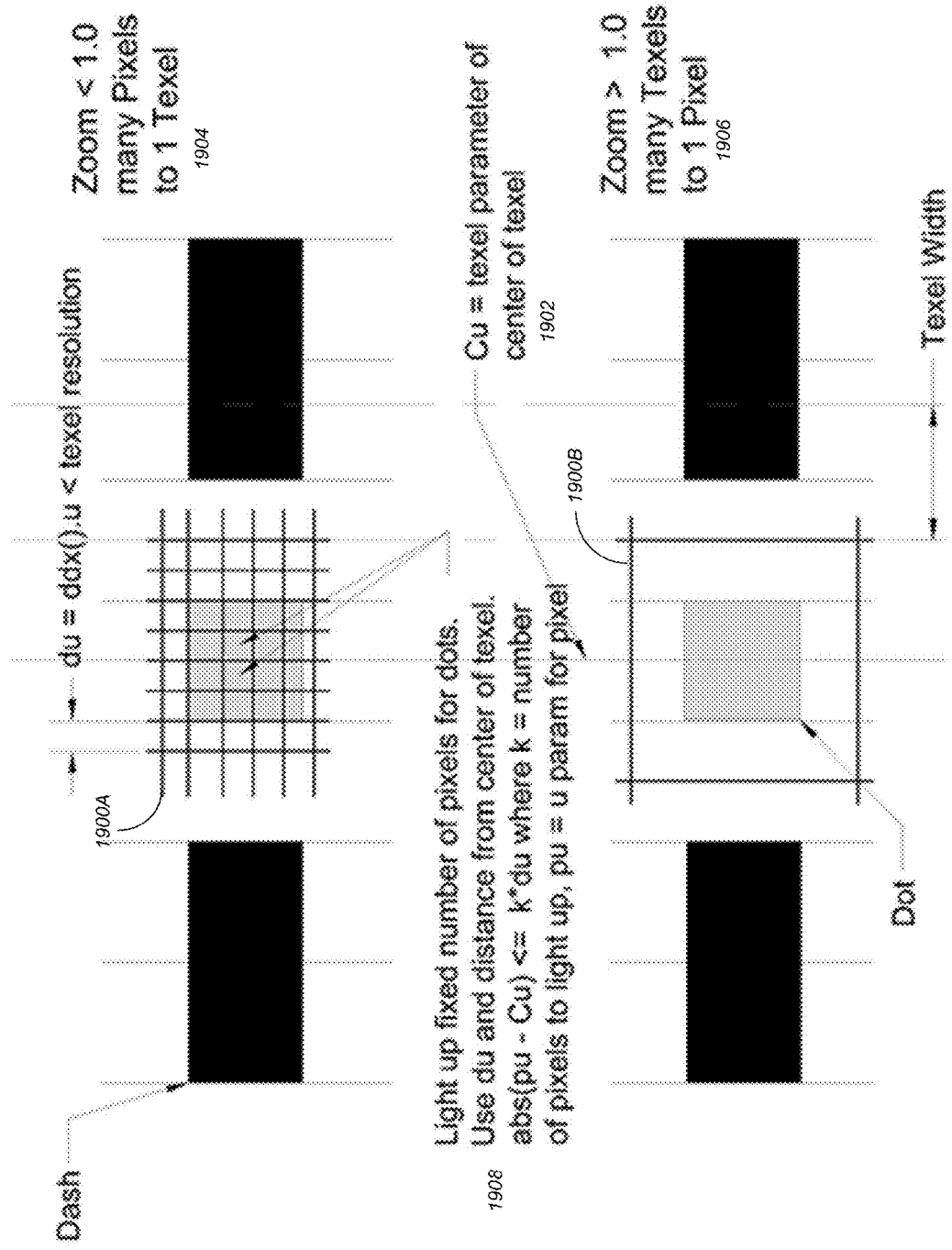
FIG. 19 illustrates the need to select a subset of pixels (to turn on) if zoomed in sufficiently, where more than one pixel maps to a texel in accordance with one or more embodiments of the invention.

FIG. 19 illustrates the need to select a subset of pixels (to turn on) if zoomed in sufficiently, where more than one pixel maps to a texel. To perform the analysis, the delta value between adjacent pixels (i.e., du which equals ddx( ).u) is computed. The grid 1900A and 1900B illustrate such du computations. The grids 1900A/1900B illustrate the pixel resolution. Accordingly, the distance between two grid lines provides the delta value between adjacent pixels.

If the zoom level provides that many pixels map to 1 texel (i.e., as illustrated at 1904), then a determination needs to be made regarding which pixels to light up. In contrast, if the zoom level indicates that many texels map to a single pixel (i.e., as illustrated at 1906), then all of the pixels being rendered may be lit up/rendered. To determine which pixels to light up, the pixel is lit up if the absolute value of the texel parameter of the center of the texel subtracted from the u parameter for the pixel, is less than or equal to the delta value between adjacent pixels multiplied by the number of pixels to light up (see 1908). In other words, if the pixel is greater than a threshold distance from the center of the texel, then it is not lit up.

Line Segment Ends

To make sure that a curve doesn't end on an invisible segment, ends can be handled by:

1. "Phase shifting" the texture map with an initial texture map offset so that the first and last dashes are as centered as possible. This will require logic on the preprocessing (CPU) side;

2. Preprocessing the curve to split end geometry separately if 1 is not satisfactory. This can be done on the preprocessing (CPU) side; and 3. Add logic in the pixel shader to detect end of curve conditions, and implement end clamping programmatically using a heuristic. This can be done in the pixel shader.

Logical Flow

Figure 20:
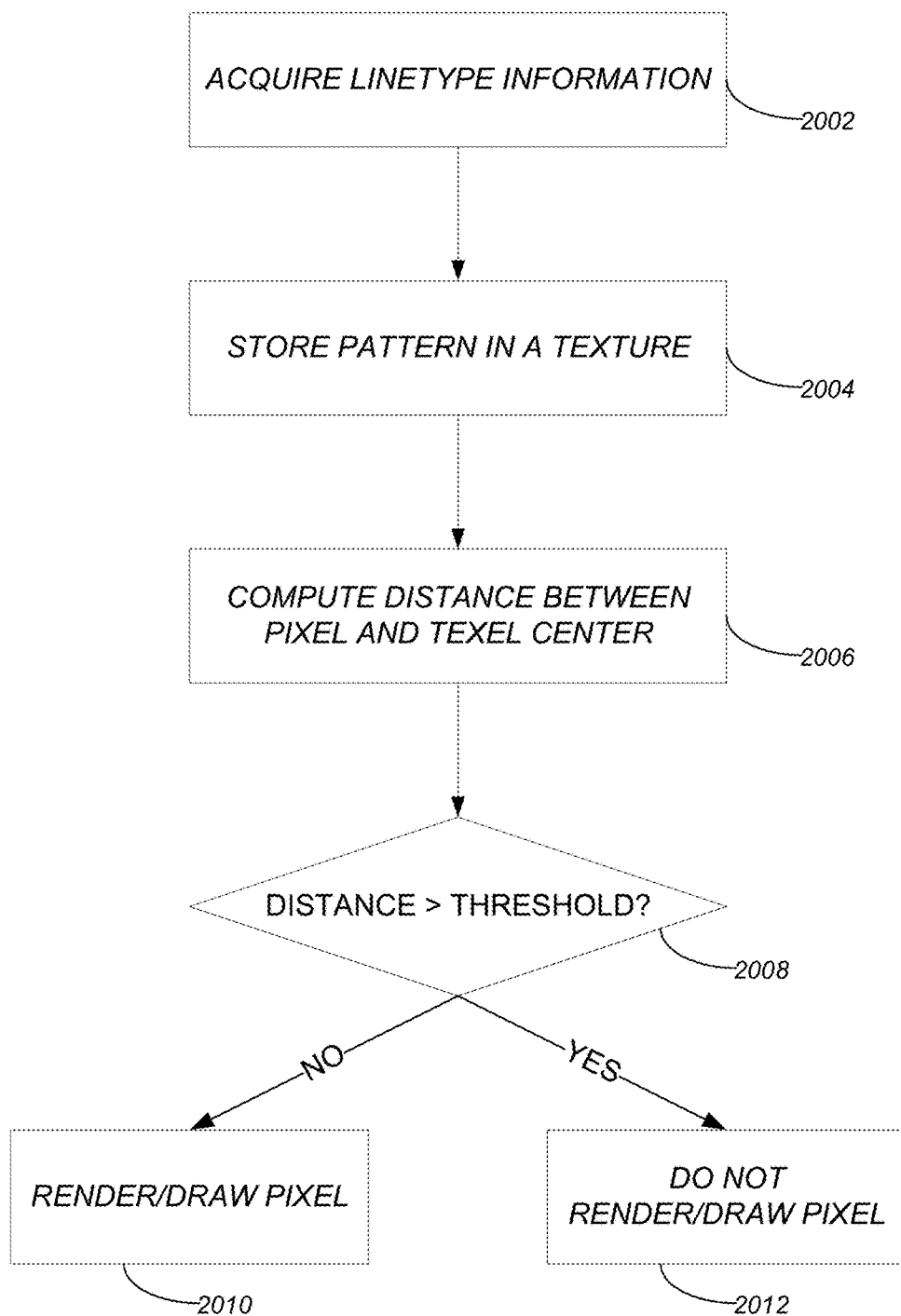
FIG. 20 illustrates the logical flow for rendering a line having line stylization/a linetype pattern via the texture mapping functionality of a graphics processing unit (GPU).

FIG. 20 illustrates the logical flow for rendering a line having line stylization/a linetype pattern via the texture mapping functionality of a graphics processing unit (GPU).

At step 2002, linetype information for a pattern of a linetype for the line is acquired.

At step 2004, the pattern is stored in a texture by encoding a type of element of the pattern and a texel center location. The type of element may be selected from a group consisting of a dash, a dot, and a space. The type of element and texel center location may be encoded as floating point numbers. If the line is an ellipse, the texel center location is encoded by approximating a length based parameter using approximation techniques.

Steps 2006-2012 are performed by a GPU to render the line. At step 2006, a distance between a pixel of the line and the texel center location is computed.

At step 2008, a determination is made regarding whether the distance exceeds a threshold (e.g., a number of pixels).

At step 2010, if the distance is within the threshold, the pixel is rendered/drawn. However, if the threshold is exceeded, the pixel is not rendered/drawn at step 2012. Accordingly, the GPU is enabled to render a line based on a zoom operation while maintaining zoom invariance for a dot(s) in the pattern.

Step 2010 may further include the ability to ensure consistency of the pattern across multiple line segments. Such an ability/capability is provided based on a cumulative length of the line across multiple line segments, a length of each of the multiple line segments (which may also be encoded), and a length of the pattern. In this regard, the position along the pattern where the type of element is located may be computed (and/or encoded with the texel center location) by the GPU to determine what portion of the pattern to begin rendering when each line segment is drawn/rendered.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for rendering a line, comprising:
    acquiring, using a central processing unit (CPU), linetype information for a pattern of a linetype for the line, wherein the pattern comprises a sequence of one or more elements, and wherein each of the one or more elements has an element type, and wherein each element type comprises a dot, a dash, or a space;
    selecting, using the CPU, a texture size width for a texture;
    scaling the pattern to fit the texture size width;
    storing, using the CPU, the pattern in the texture by encoding for each of the one or more elements: (i) the element type for the element; and (ii) a texel center location for a texel in the texture that includes the element;
    passing, from the CPU to a graphics processing unit (GPU), the texture and one or more geometry segments that define the line to be rendered, wherein the one or more geometry segments include a composite length;
    the GPU rendering the line by:
        computing an offset based on the composite length and the texel center location; and
        rendering the line utilizing the offset to determine a beginning point of the pattern, wherein a value of a pixel is determined by the element type at the offset.

2. The computer-implemented method of claim 1, wherein the texture size width corresponds to a screen resolution.

3. The computer-implemented method of claim 1, wherein the element type and the texel center location are encoded as colors.

4. The computer-implemented method of claim 1, further comprising:
    the CPU creating a canonical geometry in a form of shared vertex data for the one or more geometry segments, wherein the canonical geometry comprises a canonical envelope vertex coordinate;
    the CPU passing the canonical geometry to the GPU for rendering of the line.

5. The computer-implemented method of claim 4, further comprising:
    determining that the canonical envelope vertex coordinate comprises a x=0 quad;
    the CPU creating the composite length as a cumulative length up to a beginning of the one or more geometry segments.

6. The computer-implemented method of claim 4, further comprising:
    determining that the canonical envelope vertex coordinate comprises a x=1;
    the CPU creating the composite length as the cumulative length plus a length of the one or more geometry segments.

7. The computer-implemented method of claim 1, wherein:
    the one or more geometry segments define a circle or circle arc; and
    the composite length comprises r*theta, wherein r comprises a radius of the circle or arc, and theta comprises an angle along the circle or arc in radians.

8. The computer-implemented method of claim 1, wherein:
    the one or more geometry segments define an ellipse; and
    the composite length comprises an approximation computed as an integration of:

$$\frac{b-a}{2}\cos(2\theta) + a + \frac{b-a}{2}$$

wherein "a" comprises a semimajor axis, "b" comprises a semiminor axis, and theta ("θ") comprises an angle slope.

9. The computer-implemented method of claim 1, wherein the type of element of the pattern and the texel center location are encoded as floating point values.

10. The computer-implemented method of claim 1, wherein:
    the GPU renders the line based on a zoom operation;
    the GPU maintains zoom invariance wherein the dash in the pattern is rendered a same length irrespective of zoom level.

11. The computer-implemented method of claim 1, further comprising:
    utilizing point sampling that avoids fuzzing at ends of any dashes in the pattern.

12. A system for rendering a line in a computer system comprising:
    (a) a computer having a central processing unit (CPU) and a graphics processing unit (GPU);
    (b) the CPU:
        (1) acquiring linetype information for a pattern of a line type for the line, wherein the pattern comprises a sequence of one or more elements, and wherein each of the one or more elements has an element type, and wherein each element type comprises a dot, a dash, or a space;

(2) selecting a texture size width for a texture;
(3) scaling the pattern to fit the texture size width;
(4) storing the pattern in the texture by encoding for each of the one or more elements: (i) the element type for the element; and (ii) a texel center location for a texel in the texture that includes the element;
(5) passing, to the GPU, the texture and one or more geometry segments that define the line to be rendered, wherein the one or more geometry segments include a composite length;

(c) the GPU rendering the line by:
(1) computing an offset based on the composite length and the texel center location; and
(2) rendering the line utilizing the offset to determine a beginning point of the pattern, wherein a value of a pixel is determined by the element type at the offset.

13. The system of claim 12, wherein the texture size width corresponds to a screen resolution.

14. The system of claim 12, wherein the element type and the texel center location are encoded as colors.

15. The system of claim 12, wherein the CPU further:
creates a canonical geometry in a form of shared vertex data for the one or more geometry segments, wherein the canonical geometry comprises a canonical envelope vertex coordinate;
passes the canonical geometry to the GPU for rendering of the line.

16. The system of claim 15, wherein the CPU further:
determines that the canonical envelope vertex coordinate comprises a x=0 quad;
creates the composite length as a cumulative length up to a beginning of the one or more geometry segments.

17. The system of claim 15, wherein the CPU further:
determines that the canonical envelope vertex coordinate comprises a x=1;
the CPU creates the composite length as the cumulative length plus a length of the one or more geometry segments.

18. The system of claim 12, wherein:
the one or more geometry segments define a circle or circle arc; and
the composite length comprises r*theta, wherein r comprises a radius of the circle or arc, and theta comprises an angle along the circle or arc in radians.

19. The system of claim 12, wherein:
the one or more geometry segments define an ellipse; and
the composite length comprises an approximation computed as an integration of:

$$\frac{b-a}{2}\cos(2\theta) + a + \frac{b-a}{2}$$

wherein "a" comprises a semimajor axis, "b" comprises a semiminor axis, and theta ("θ") comprises an angle slope.

20. The system of claim 12, wherein the type of element of the pattern and the texel center location are encoded as floating point values.

21. The system of claim 12, wherein:
the GPU renders the line based on a zoom operation;
the GPU maintains zoom invariance wherein the dash in the pattern is rendered a same length irrespective of zoom level.

22. The system of claim 12, wherein the CPU or the GPU:
utilize point sampling that avoids fuzzing at ends of any dashes in the pattern.

* * * * *